INVENTORS
James H. Guyton
Phillip A. Lutz &
Edward G. Stedry
Robert E. Fowler
ATTORNEY May 27, 1969 J. H. GUYTON ET AL 3,447,088

COMBINATION TUNER FOR SHORTWAVE TWO-WAY RADIO AND BROADCAST RECEIVER

Filed Jan. 18, 1967

INVENTORS
James H. Guyton,
Phillip A. Lutz, &
Edward G. Stedry

Robert E. Fowler
ATTORNEY 3,447,088
COMBINATION TUNER FOR SHORTWAVE TWO-WAY RADIO AND BROADCAST RECEIVER
James H. Guyton, Phillip A. Lutz, and Edward G. Stedry, Kokomo, Ind., assignors to General Motors Corporation, Detroit, Mich., a corporation of Delaware
Filed Jan. 18, 1967, Ser. No. 610,123
Int. Cl. H04b *1/06, 1/38;* H03j *5/32*
U.S. Cl. 325—458 5 Claims

ABSTRACT OF THE DISCLOSURE

A band switching and push button tuning means for a radio broadcast receiver and a two-way emergency transceiver in which depression of certain of the push buttons indexes the radio broadcast receiver to certain stations and the depression of another push button switches out broadcast receiver operations, locks the tuner in a given position, and automatically switches in the two-way transceiver for operation in a different band.

*Background of the invention*

Mechanical push button tuning means for broadcast receivers have been known for some time which quickly and easily index the receiver to certain preset stations usually used for reception. Such a tuner is shown, for example, in Schwarz, 2,494,008, issued Jan. 10, 1950. This construction provides both push button and manual control for a radio broadcast receiver and is of the general type now in commercial use. There are also more sophisticated combination radio tuner controls in commercial use for broadcast receivers in which not only are manual and mechanical preset push buttons provided, but also a signal seeking or stop-on-signal indexing feature. Such a type of tuner is disclosed in the prior art in Gaskill et al. 2,852,944 and Gaskill et al. 2,857,519.

*Summary of the invention*

There is, however, a need for providing the driver of a vehicle with an emergency transceiver for short range use which can be operated for summoning assistance in the event it is needed for any reason such as the car ceasing to function at a point remote from garage services. It is an advantage to incorporate such short range receiver and transmitting equipment in the same package with the conventional broadcast receiver for ease in operation and it is the purpose of the present construction to provide such combination control apparatus for both the radio broadcast receiver and the emergency transceiver and switching from one to the other.

*Description of the preferred embodiment*

The conventional broadcast receiver normally operates in the frequency band of 540 to 1600 kc. This is the band allotted by the Federal Communications Commission and within which the various broadcasting stations transmit. Any other transmission and reception for other purposes is obviously at other frequency allocations and one of the frequency bands available for emergency use, such as has been explained, is the so-called citizens band which is in the neighborhood of 27.5 mc. In order to make the apparatus operation simple and to interlock the parts so that there cannot be any confusion on the part of the operator, a single combination tuning control is provided with a color code so that operation is very easy. Most owners and operators of conventional broadcast receivers in automotive vehicles are well acquained with mechanical push button tuner receivers, which push buttons can be easily preset to tune in a multiplicity of favorite broadcast stations in a given locality in which the car is operating. Pressure on any one of those buttons will bring in the desired station. Only when the car is moved to another area is it necessary to reset the same, or if the operator desires to change to a different group of stations. The design incorporates a single similar button which is color coded so that the operator is aware that when he presses this button he switches out the broadcast receiver, switches in his emergency transceiver equipment and puts it in operation. He can then pick up his portable microphone to transmit-receive.

Figures 1, 2:
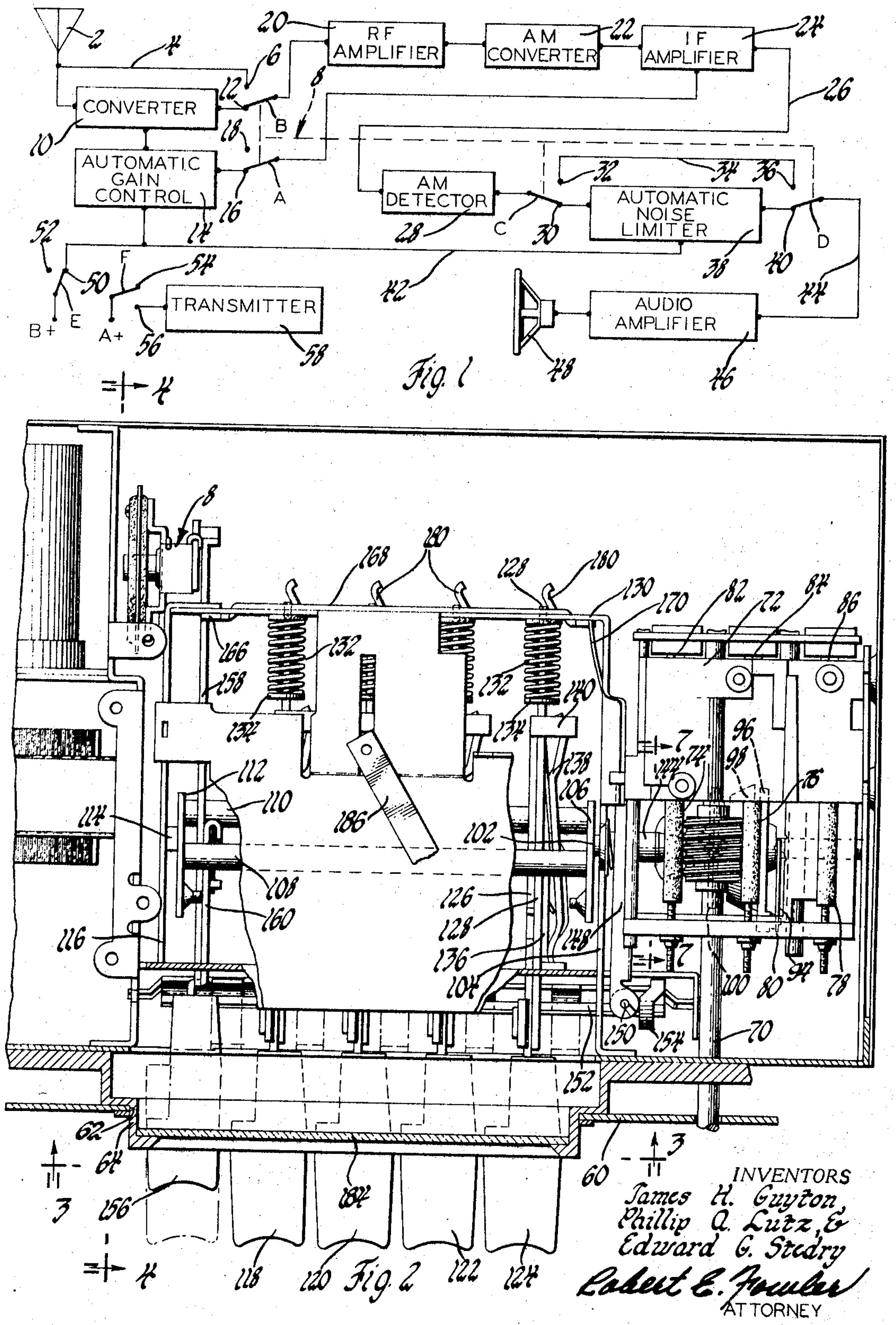
FIGURE 1 is a block diagram of the radio circuitry embodying the invention.
FIG. 2 is a top plan view of the tuner, parts being broken away and shown in section.

Referring first to the circuitry as shown in FIG. 1, a single antenna is used for both receiving systems which is shown at 2. This antenna is connected directly through a conductor 4 to stationary switch point 6 of a multiple pole, double throw switch 8 having arms A, B, C, and D, all of which are operated together as a gang. Actually this switch is in the form of a rotary switch and will be explained later with regard to the mechanical tuning means. The antenna 2 is also connected to a converter 10 and from the converter 10 to a second stationary switch point 12 on the multi-pole switch 8. Movable switch arm B contacts point 12 in one position and point 6 in the other. The converter is also connected to an automatic gain control 14 and from that gain control to a stationary switch point 16 which is engaged by movable gang switch arm A. Switch arm A also contacts a stationary switch point 18 which is unattached.

Movable switch arm B is directly connected to the RF amplifier 20 of a broadcast receiver, conventionally feeds into the AM converter 22 to reduce the frequency to the intermediate frequency followed by an IF amplifier 24. The output of the IF amplifier is applied through line 26 to the AM detector 28 where the normal AM signal is obtained.

This AM detector is directly connected to movable switch arm C on the switch 8. Switch arm C moves between two stationary contact points 30 and 32. Point 32 is connected to a bypass line 34 and thence to a second stationary contact 36 engageable by switch arm D and when engaged by that arm completes a bypass around the automatic noise limiter 38. Stationary switch point 30 is directly connected to the automatic noise limiter 38, the output of which is fed to stationary switch point 40. Limiter 38 is also connected back through feedback line 42 to the automatic gain control 14. Movable switch D of the switch 8 is connected through line 44 with the audio amplifier 46 of the broadcast receiver and thence to the speaker unit 48.

A separate microphone spring biased switch having two switch arms E and F is provided. The power supply high voltage labelled B+ is directly connected to movable switch arm E in this switch which engages stationary contact 50 connected to line 42. This movable switch arm E can also be moved into engagement with a stationary contact 52 in its second position which is unconnected. Arm F is connected to the low voltage source A+ and it is movable between two stationary contacts 54 and 56, the latter being connected to transmitter 58 and contact 54 is unconnected. The multiple switch arms A, B, C, and D of switch 8, when they are set in the above positions shown energize the receiver for reception of emergency signals in the citizens band. The emergency short range radio frequency waves encountering the antenna 2 pass through the converter 10 to be reduced in frequency to the normal broadcast range of 1615 kc. and are then fed into the RF amplifier through which they are passed in the conventional manner for detection through the automatic noise limiter and amplified and applied to the speaker. With the multiple switch arms all in the second position the normal broadcast receiver operates in the conventional manner to produce the broadcast signals. At that time the signals fed to the antenna are fed directly through line 4, movable switch arm B into the RF amplifier 20, AM converter 22, IF amplifier 24, line 26, through the AM detector 28, switch arm C in its upper position, bypass line 34, switch D in its upper position and applied to the audio amplifier.

Microphone switch arms E and F are spring biased to the position shown at all times except when it is desired to operate the transmitter at which time these two arms are simultaneously moved to their opposite switch points. This closes the switch from the power supply A+ to the transmitter and opens the power line to the receiver. This cuts out the receiver while the transmitter was being operated. As soon as this button is released these switches assume the position shown to de-energize the transmitter and re-energize the receiving apparatus.

Figure 3:
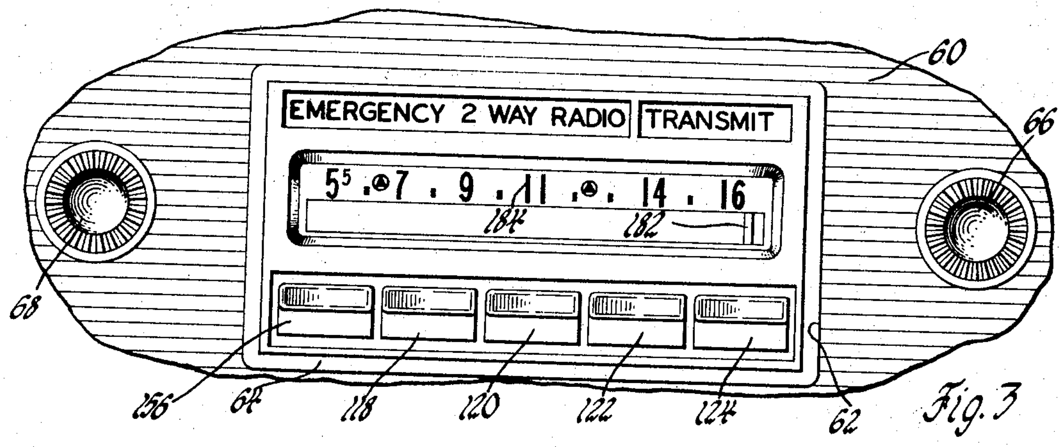
FIG. 3 is a front elevation of the apparatus mounted in an instrument panel taken on line 3—3 of FIG. 2.

Referring now to the mechanical portion of the device, FIG. 3 shows the control means as mounted in the instrument panel 60 of a vehicle. There is a roughly rectangular opening 62 in this panel through which projects the forward portion 64 of the tuner casing. Also projecting through the panel 60 are two shafts upon which control knobs 66 and 68 are mounted, said shafts extending back into the apparatus. Knob 68 may control the off-on switch and volume control, whereas knob 66 is mounted on shaft 70 which is the manual tuning control for the receiver. The actual tuning means for the receiver, which is tuned by changing the inductance, consists of a plurality of inductance coils connected in the various tunable circuits (see FIG. 2) which coils are mounted in a housing 72 and in this case there are three coils; an antenna coil 82, an RF coil 84, and oscillator coil 86. These are all tuned to provide the proper range for tuning over the normal broadcast band by the insertion of comminuted iron cores 74, 76 and 78, respectively, all of which are adjustably mounted on reciprocating bar 80. The bar 80 has an integral longitudinal section 88 (see FIG. 7) which extends back toward the housing 72 and acts as a support. This section slides on a guide rod 90. A depending ear 92 extends downwardly from section 88 and to it is pivotally connected drive link 94. One side of the clutch plate 96 has an extension and the end of this is pivotally connected to the link 94. This plate is rigidly secured to stub shaft 102 and rotates when the tuner slide 88 moves in and out to tune the receiver. The other side of the clutch is formed by plate 98 mounted on a sleeve 144 concentric with shaft 102 and directly connected to a spur gear 100 also mounted on the sleeve 144 which utilizes as a bearing stub shaft 102 trunnioned in an upstanding wall 104 of the casing.

The stub shaft 102 upon which the clutch plate 96 is mounted proceeds through the wall and is rigidly fastened to one face of a transverse arm 106 which forms one side of the treadle bar, there being two spaced rods 108 and 110 connected to opposite ends thereof which extend across the tuner. A similar and parallel arm 112 (see FIG. 2) is connected to the other end of the rods 108 and 110 to complete the treadle bar assembly. A bearing member 114 trunnioned in an opposite frame member 116 supports the opposite end of the treadle bar.

The tuning cores 74, 76 and 78 may be moved in and out of their respective coils either by rotation of the manual knob 66 or depression of any one of the push buttons to rotate the treadle bar assembly. With the clutch faces 96, 98 in engagement which they normally are due to spring bias, the manual knob 66 drives the bar 80 to tune the receiver. When any of the push buttons are depressed, the clutch is open by initial movement of the slides and then the treadle bar moved to a predetermined position by the cam mounted thereon for that push button as will be described.

The mechanism for rotating the treadle bar is provided by the various reciprocating push button slides. Four of the slides 118, 120, 122 and 124 are identical in structure and so only one will be described. They each have a cam which may be individually set to rotate the treadle bar to different arcuate positions representing the correct tuning for desired stations. Each slide assembly consists of a pair of slide members 126, 128, the slide member 126 extending through the front panel and having a push button, such as 124, affixed to its outer end, whereas the slide 128 extends through rear panel 130 and supports the rear end of the assembly. This slide has a coil spring 132 mounted around it, one end of which presses against the panel 130 and the other against a fixed disc 134 mounted on the slide to bias the assembly forward. Slide 128 also carries an arcuately adjustable cam 136 which is adapted to engage the transverse rods 108 and 110 to turn the treadle bar to different angular positions depending upon the locked setting of the cam. The slide construction is shown and described in Schwarz, et al., 2,489,544.

This cam 136 is rotatably mounted on slide 128 and is locked in place by pivoted locking lever 138 which bears against one corner when saddle 140 is forced inwardly by relative movement of the two slides. The cam 136 may be unlocked by pulling outwardly on push button 124. This permits slide 126 to move forward with respect to slide 128. Saddle 140, therefore, moves down the slope of the locking lever, releases the lever 138 and permits cam 136 to turn. The tuner is then set to the proper station manually by rotation of knob 66 and inward pressure on the slide assembly will first bring the free cam 136 into proper arcuate position by engagement with the treadle bar rods 108 and 110 and further inward motion will cause slide 126 to move inwardly with respect to slide 128 and re-lock the cam. All of the push button slide assemblies 118, 120 and 122 are similar to 124. Therefore, this portion of the tuner enables the operator to preset any four broadcast stations to which the tuner may be quickly indexed upon the operator's wish.

For manual tuning the shaft 70 upon which the manual knob 66 is secured has mounted on its inner end a worm gear 142. This engages the spur gear 100 mounted directly below the same on sleeve 144. If the clutch is in engagement, the clutch is rotated to drive shaft 102 and the tuner in the same manner. When any of the push buttons 118 through 124 are depressed it is necessary, of course, to uncouple the manual tuning drive. This is accomplished by actuating the clutch. The clutch half 98 being the movable half and spring biased is not fixedly secured to the shaft 102 but the sleeve 144 and can be slightly moved away from contact with the clutch half 96 which is rigidly secured to the shaft. This is accomplished by movement of the sleeve 144 which is secured to the clutch member and can rotate with it freely on the shaft 102. It is slid along the shaft for a short distance by an actuating slotted arm 148 which is pivotally attached at its forward end at 150 to a transverse locking bar 152 having a clutch actuating finger 154. Upon inward movement of any of the push buttons, and that includes the fifth button 156 whose operation has yet to be described and is the emergency two-way button, the locking bar 152 will be rotated, moving finger 154 about its axis to force the end of the lever 148 to the left as shown in FIG. 2 and actuate the clutch to disconnect the manual drive. Incidentally, FIG. 2 shows this portion in actuated position and the clutch disengaged since the push button 156 is shown depressed.

Figures 4, 5, 6, 7:
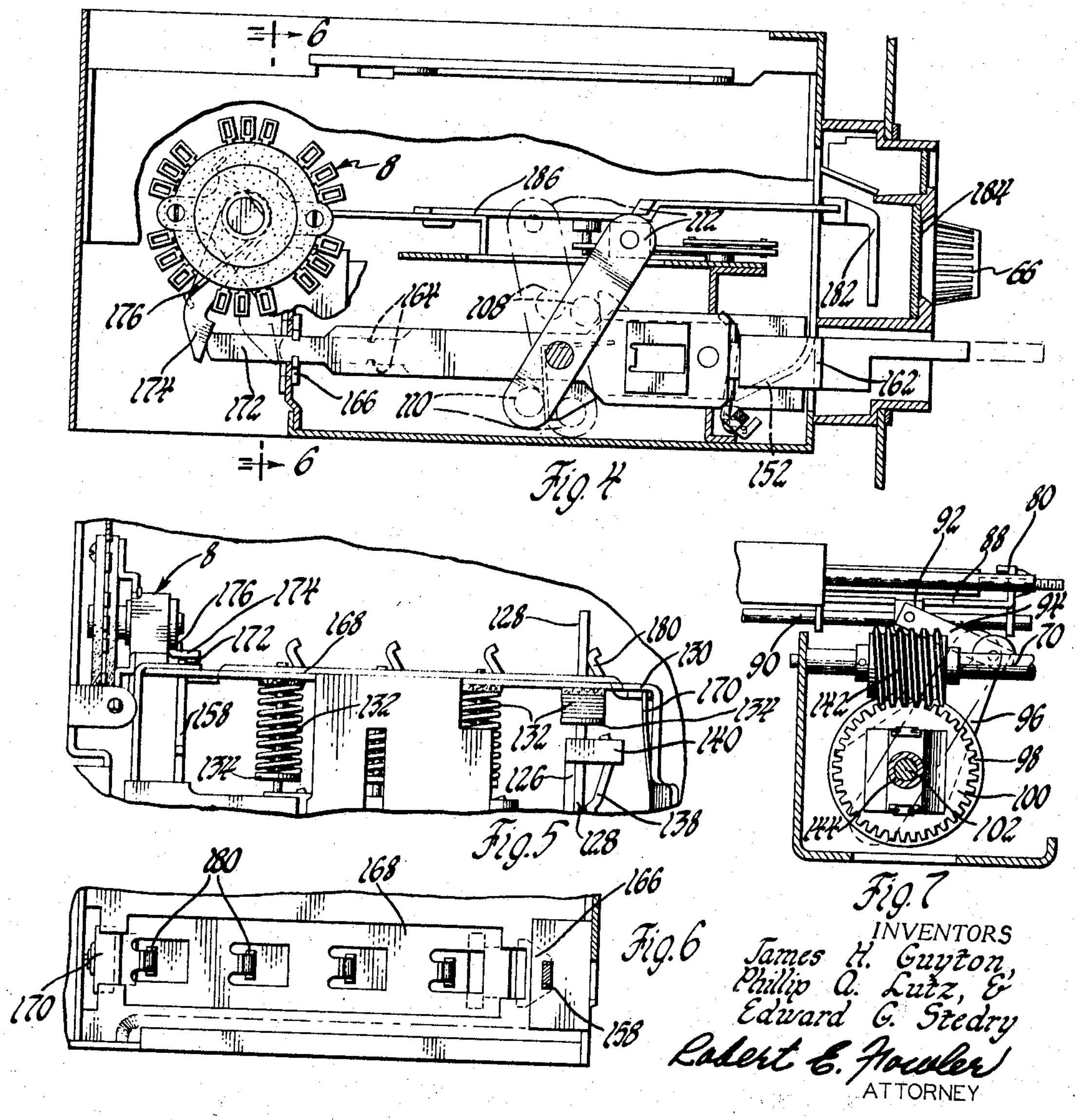
FIG. 4 is a sectional view taken through the tuning means taken on line 4—4 of FIG. 2.
FIG. 5 is a detailed view of the mechanical interlocking means showing it in its broadcast band operating position.
FIG. 6 is a partial rear elevation of the interlocking means shown in short wave two-way operating position taken on line 6—6 of FIG. 4; and, FIG. 7 is a detail sectional view taken on line 7—7 of FIG. 2 showing the driving connections between the treadle bar and the tuner.

For emergency two-way operation, the color coded button 156 is depressed. This immediately moves the tuner to one end of its travel and locks this button in, which the rest of the buttons will not do. This maintains the tuner in this position and permits the emergency operation. At the same time it disconnects the manual tuner and actuates switching means to place the system in proper condition for two-way communication. The slide upon which push button 156 is mounted differs from the rest. It embodies a single slide 158 instead of one having multiple parts. It incorporates a single cam 160 which is fixed in the position in which it engages the treadle bar and always indexes the same to one position at one end of travel. This slide does incorporate a projection 162 (see FIG. 4) for rotating the clutch operating transverse member 152 so that the clutch is operated as soon as the push button starts inward. Toward the rear end of the slide 158 a pair of opposed notches 164 are adapted to align themselves with the projecting forked end 166 of the locking bar 168. This locking bar is spring biased toward the left as shown in FIG. 5 by a spring 170. As the two opposed notches come into alignment with the end 166 it moves into this slot and, therefore, locks the slide in its innermost position for shortwave operation.

The inner end 172 of the slide 158 acts as an operator for the switching means originally described with regard to FIG. 1. This is shown as a rotary switch 8 and includes the arms A, B, C, and D (FIG. 1). When arm 172 engages switch operating lever 174 it moves the rotating switch to one position against the bias of the spring 176. When the slide is unlocked, spring 176 will return the switch 8 to its original position.

When the operator has completed his use of the emergency two-way radio, forcing in any of the other push buttons 118, 120, 122 and 124 will force the locking slide 168 to the right against the pressure of the spring 170 to unlock the slide 158 and allow it to return to its forward position. This is accomplished through pressure by the inner end of any of the slide assemblies, such as 178, against its associated curved projection 180 on the locking bar 168. The position of the tuner is indicated by needle 182 which moves over a dial 184 and is connected through a driving linkage 186 with the treadle bar to move proportionally across the scale as the treadle bar moves between extreme positions.

From the above it will be clear that the operation of the system is quite simple. The car driver simply controls the broadcast radio receiver as he would normally do, either tuning it manually by movement of the knob 66 to tune in any desired stations, or to force inwardly any of the push buttons 118, 120, 122 or 124 to receive his preset favorite broadcast stations. If, however, any emergency arises and he desires to operate on the short two-way radio, he merely depresses the red button 156. This accomplishes two things: it moves the tuner to one extreme position of its travel and its tuning position is then known. It locks out all other operation of the receiver. It switches from broadcast band operation to shortwave operation. It immediately places the receiver in condition for receiving in that band. The operator then picks up his microphone and if he desires to transmit he depresses the microphone button. This operates switches E and F in FIG. 1 to cut off the receiver and energize the transmitter so that he may talk without interfering with the receiver. When he releases the button on the microphone, switches E and F assume the position shown in FIG. 1 and the set is ready to receive on that band. Returning to broadcast reception, pressure on any push button from 118 through 124 will immediately release button 156, operating gang switch 8 to return the radio receiving apparatus to broadcast band reception.

What is claimed is:

1. In radio apparatus for receiving modulated signals transmitted in the broadcast band and also in the shortwave band for emergency use having variable broadcast tuning means for tuning over the broadcast band of frequency, a plurality of reciprocable adjustable means engageable with the variable broadcast tuning means to move the variable broadcast tuning means to different positions to receive different frequency modulated waves within the broadcast band, a further reciprocable means engageable with the variable broadcast tuning means to move the same to one end of its travel and simultaneously tune the variable broadcast tuning means to one end of the band, a converter connectible to the variable broadcast tuning means to produce therewith proper shortwave reception, switching means interconnecting the converter and the variable broadcast tuning means for receiving broadcast signals, said switching means being actuated by said further reciprocable means so that actuation thereof places the radio apparatus in condition for operation in the shortwave band.

2. Radio apparatus as defined in claim 1 including locking means actuated by reciprocable movement of the further reciprocable means to lock it in full operated position, means on each of the plurality of reciprocable adjustable means to upon movement of each thereof unlock the reciprocable means to engage and unlock the locking means so that forcing in any of the plurality of reciprocable adjustable means will first unlock the further reciprocable means and then move the variable broadcast tuning means to a desired given broadcast station to change from shortwave reception to broadcast band reception.

3. In radio apparatus for receiving modulated signals in the broadcast band and also in the shortwave band, variable broadcast tuning means for tuning over the broadcast band between fixed limits, reciprocable push button slides having adjustable means thereon to engage the variable broadcast tuning means upon reciprocation and move the same to different desired positions for favorite station reception, converter means, switching means to connect said converter to said variable broadcast tuning means to properly adjust the apparatus to receive shortwave signals, further reciprocable push button slide means identifiable from the other push button slides engageable with said broadcast tuning means to bring the variable broadcast tuning means to one limit of travel and simultaneously actuate the switching means to change from broadcast to shortwave operation upon actuation of said further identifiable slide.

4. Radio apparatus as defined in claim 3 including locking means engageable by all of the reciprocable push button slides for locking said further identifiable push button slide in fully actuated position for shortwave operation but release the same upon actuation of any of the other reciprocable push button slides.

5. Radio apparatus as defined in claim 3 including locking means engageable by all of the reciprocable push button slides for locking said further identifiable push button slide in fully actuated position for shortwave operation but release the same upon actuation of any of the other reciprocable push button slides, manually operable means, clutch means interconnecting said manually movable means with said variable broadcast tuning means so that it may be manually tuned when the clutch is in engagement and clutch operating means engageable by all of the push button slides including the further push button slide to actuate the same and open the clutch means upon movement of any of the push button slides.

References Cited

UNITED STATES PATENTS

| | | |
|---|---|---|
| 2,315,331 | 3/1943 | Horowitz. |
| 2,863,043 | 12/1958 | Schmidt. |
| 3,212,343 | 10/1965 | Clark. |
| 3,247,728 | 4/1966 | Wolf. |

KATHLEEN H. CLAFFY, *Primary Examiner.*

B. P. SMITH, *Assistant Examiner.*

U.S. Cl. X.R.

334—7